Dec. 2, 1969  L. J. MARTINSEN  3,482,103
APPARATUS FOR CONTROLLING TRAVEL PATH OF A MOVABLE DEVICE
Filed Oct. 11, 1965  3 Sheets-Sheet 1
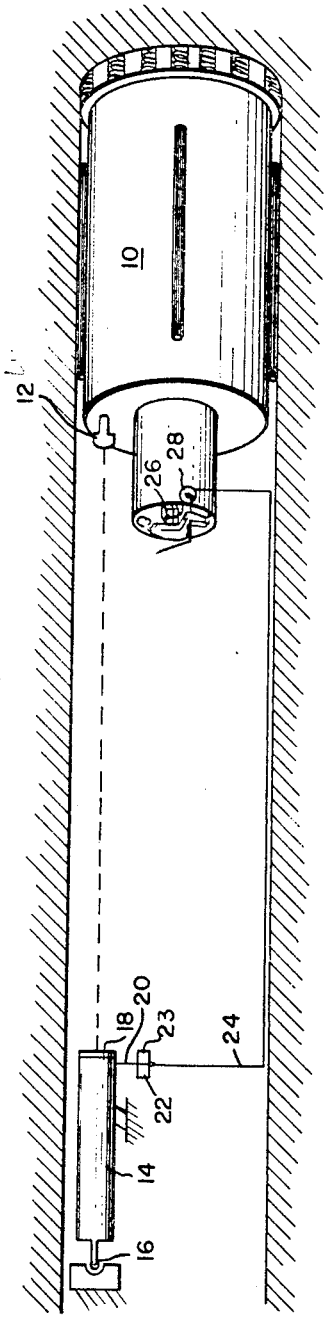
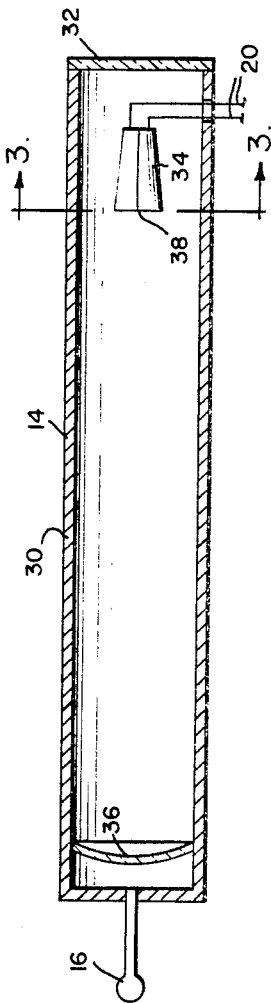
Lyle J. Martinsen,
INVENTOR.
BY.
Bernard Kriegel
ATTORNEY.

Lyle J. Martinsen,
INVENTOR.
BY.

*Bernard Kiegel*

ATTORNEY.

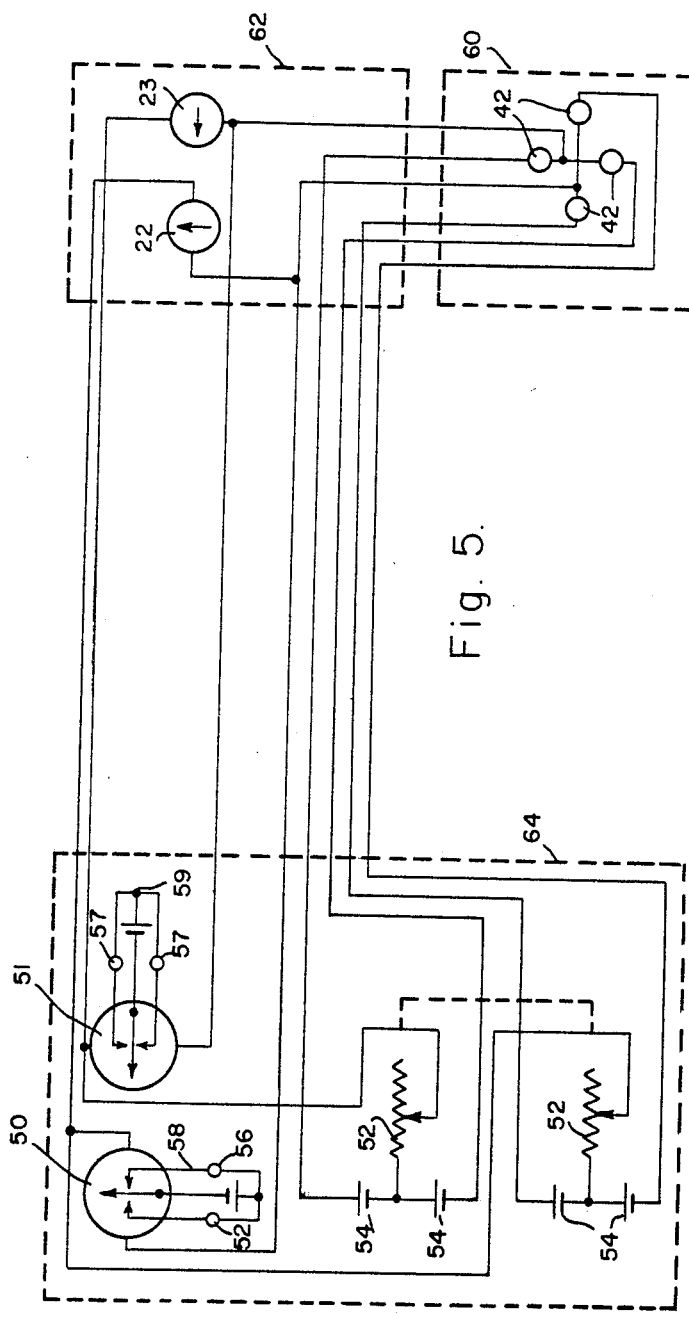
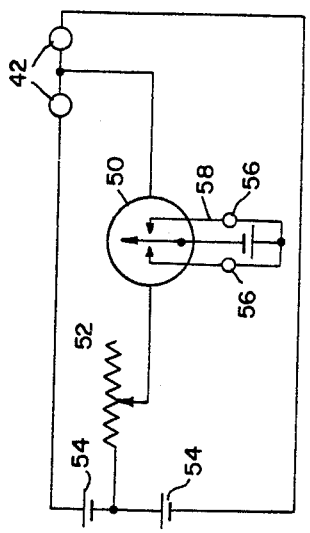
Fig. 5.
Fig. 6.
Lyle J. Martinsen,
INVENTOR.
BY.
Bernard Kriegel
ATTORNEY.

United States Patent Office 3,482,103
Patented Dec. 2, 1969

3,482,103
APPARATUS FOR CONTROLLING TRAVEL PATH OF A MOVABLE DEVICE
Lyle J. Martinsen, Murray, Utah, assignor to Boyles Bros. Drilling Company, Salt Lake City, Utah, a corporation of Utah
Filed Oct. 11, 1965, Ser. No. 494,458
Int. Cl. G01j 1/20
U.S. Cl. 250—203         14 Claims

ABSTRACT OF THE DISCLOSURE

A system for indicating direction and magnitude of deviation from a desired path of travel of a movable device along a predetermined reference line, particularly for maintaining a tunneling machine along a predetermined tunnel center line. A light source is affixed to the tunneling machine and a remotely located light collector means is aligned parallel to the tunnel center line and receives light rays from the source which are parallel to the machine travel direction. A plurality of photocells are positioned symmetrically about the optical axis of the aligned light collector means, and the photocells are responsive to changes in relative illumination about the optical axis. Signaling and display means are coupled to the photocells for providing signals representing deviations of the tunneling machine from the desired path of travel.

---

This invention relates to a system for maintaining a movable device on a desired path of travel relative to a predetermined reference line, and more particularly to a system for maintaining a tunneling machine along a desired path of travel which conforms to a predetermined tunnel center line.

In the driving of tunnels, it is often advantageous to utilize a tunneling machine of the type that travels along a predetermined tunnel center line and is braced against the tunnel walls while continuously cutting the tunnel face. Excavated material is removed and the machine is periodically advanced and again anchored, thereby boring the tunnel to conform to the described run.

Varying geological structure of the material to be excavated, and local relative displacement of the points of support of the machine at the walls of the tunnel, contribute to the difficulty of maintaining a prescribed excavation path. Because of these and other complications, the machine tends to deviate from its prescribed course. Further, there exists the practical problem arising from the inability of a human operator to accurately compensate for slight deviations in the orientation of the machine.

When it is intended that a tunnel connect two points, it is imperative that proper direction of the tunnel advance be precisely maintained. Furthermore, when tunneling is carried out simultaneously from more than one portal, absolute precision in maintaining direction is essential for an accurate meeting of the various segments.

Heretofore, frequent surveys were made to keep the tunneling machine along the predetermined tunnel center line. Such surveys were necessary to detect minor path deviations before they become major.

The present invention avoids the necessity of performing this virtually continuous series of surveys by continually determining any deviations from the desired path of travel of a machine along a predetermined reference line. It is to be understood that the word "line" as used herein includes the surveying term "line and grade," and could also include a curved path of travel as will be pointed out below.

The present invention detects undesired deviations from a desired path of the machine to be guided, and provides signals representing the direction and relative magnitude of the undesired movement to enable corrective measures to be taken. According to a preferred embodiment of the invention, a radiation source is mounted on the machine which is initially positioned along the predetermined reference line. A radiation collector, having an optical axis, is aligned to be parallel to the predetermined reference line and receives substantially parallel rays from the radiation source.

Radiation sensitive means, located remotely from the source in a fixed position, are symmetrically positioned with respect to the optical axis of the radiation collector. A spot of impinging radiation is caused to move over the radiation sensitive means, and the movement of the spot corresponds to the undesired movements of the radiation source. The radiation sensitive means are also responsive to changes in relative irradiation about the optical axis of the collector, so that the path of the radiation spot can be "followed" when signaling and display means are connected to the radiation sensitive means.

The resulting signals then correspond to direction and magnitude of deviations from the desired path of travel of the machine, such path being relative to the predetermined reference line, enabling corrective measures to be taken. Such corrective measures may include redirection of the machine by an operator, as well as automatic redirection by the incorporation of suitable servomechanisms into the system.

The use of the present invention in conjunction with a tunneling machine is merely one of several possible embodiments in which the invention may be employed. In alternative embodiments, the present invention may be used with a contouring machine, an example of an application of such a machine being the removal of protuberances and irregularities from an otherwise smooth surface. Furthermore, the present invention may be used to maintain any movable device along a desired path of travel conforming to a predetermined reference line. Reference herein to a tunneling machine is intended to be illustrative only, and is not to be considered as restrictive.

Accordingly, it is an object of the present invention to provide a system for indicating direction and magnitude of the deviations from a desired path of travel of a movable device, such path of travel being relative to a predetermined reference line.

It is a further object of the invention to provide a system for the automatic guidance of a movable device in a desired path of travel relative to a predetermined reference line.

It is a still further object of the invention to provide a system for indicating to the operator of a tunneling machine the direction and magnitude of the deviations of the path of the travel of the machine from a predetermined tunnel center line.

It is also an object of the invention to provide a system for the automatic guidance of a tunneling machine to maintain a desired path of travel along a predetermined tunnel center line.

It is a further object of the invention to provide a system for indicating direction and magnitude of deviations from a desired path of travel of the contour mechanism of a contouring machine, such path of travel being relative to a predetermined reference line.

It is a still further object of the invention to provide a system for the automatic guidance of the contour mechanism of a contouring machine according to a desired path of travel relative to a predetermined reference line.

It is a further object of the invention to provide apparatus for collecting substantially parallel rays of radiation emitted from a radiation source and for converging these rays into a spot on a plane, the position of the spot relative to a reference point representing movement of the radiation source from a predetermined line.

It is a still further object of the invention to provide apparatus for determining the position of a radiation spot on a plane relative to a reference point, and for signaling and displaying representations of these relative positions of the spot.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is a schematic representation of an embodiment of the present invention used in conjunction with a tunneling machine;

FIG. 2 is a side sectional view of the collector tube assembly of the embodiment of FIG. 1;

FIG. 5 is a schematic representation of an electrical network associated with the embodiment of the invention; and FIG. 6 is a schematic representation of a portion of the electrical network of FIG. 5, limited to the circuits associated with a pair of photoelectric cells.

Figure 3:
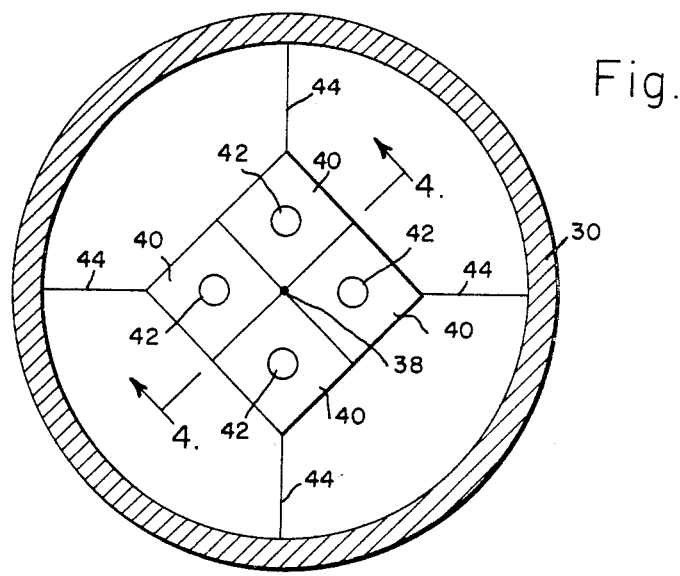
FIG. 3 is an enlarged sectional view taken along the line 3—3 on FIG. 2.

With reference to the drawings, there is shown in FIG. 1 a preferred embodiment of the present invention used in conjunction with a tunneling machine 10 for the purpose of illustration. A light source 12 is mounted on the tunneling machine 10 so that it can be "seen" from the rear of the machine. The light source may be omnidirecting or may be a "sealed beam" type of focused spot light which is positioned to throw a spot of light parallel to the travel path of the machine. The system of the present invention is set up by positioning the tunneling machine 10 exactly along a predetermined reference line which coincides with the desired path of the tunnel by conventional survey methods. A survey reading is then taken to determine the position of the center of the light source 12 relative to the reference line. A collector tube assembly 14 is then mounted on the wall of the tunnel at a position behind the tunneling machine 10. A pivot point 16, located on the optical axis of the collector tube assembly 14, is positioned so that the pivot point 16 and the center of the light source 12 on the tunneling machine define a line that is parallel to the predetermined reference line. The opposite end 18 of the collector tube assembly 14 is then adjusted until the optical axis of the reflector tube assembly 14 intercepts the "center" of the light source 12, thereby aligning the optical axis of the collector tube assembly 14 parallel to the predetermined reference line and intercepting the light source 12.

In FIG. 1, electrical wires 20 are indicated as connecting the collector tube assembly 14 to two electrical indicating meters 22, 23. In the illustrated system, the meters 22, 23 are current indicating devices. An extension cord 24 connects these meters 22, 23 to a control box 26 which is situated in a convenient location for observation by an operator of the tunneling machine 10. A wind-up reel 28 for the extension cord 24 is provided within reach of the operator.

In FIG. 2, there is shown a side sectional view of the collector tube assembly 14. The collector tube assembly includes a tube housing 30, a window 32, a photocell unit 34, and a mirror 36. The mirror 36 both collects and reflects the radiation received from the light source 12 into a concentrated spot at the face of the photocell unit 34. In this embodiment, the mirror 36 is concave with its focal point located on the optical axis within the collector tube assembly 14.

Figure 4:
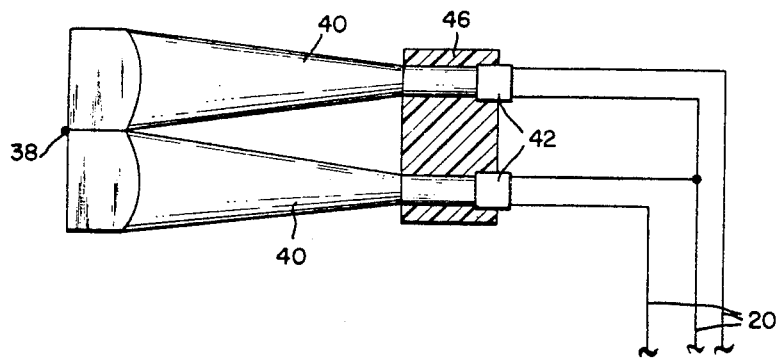
FIG. 4 is a side sectional view taken along the line 4—4 on FIG. 3.

Turning next to FIGS. 3 and 4, in addition to FIG. 2, the photocell unit 34 is shown in greater detail therein. When the optical axis of the collector tube assembly 14 is positioned parallel to the predetermined reference line and intercepting the light source 12, the light rays which enter the collector tube assembly are substantially parallel to the optical axis and to the desired travel path. These rays pass through the window 32, and the rays which are not blocked by the photocell unit 34 are reflected by the mirror 36 and concentrated into a relatively small spot upon the face of the photocell unit 34.

It is recommended that the total area of the face of the mirror 36 exceed by at least 50 percent the total area of the face of the photocell unit 34 to assure a sufficient light gathering capability of the mirror 36 in order to establish a suitable light spot.

Four light funnels 40, constructed, for example, of polished plastic or mirror-coated glass, are arranged in relation to each other at a plane which coincide with the face of the photocell unit 34, such that one corner of each funnel coincides at a common point on the optical axis of the collector tube assembly 14, and those sides which are therefore required to be proximate are themselves common with the sides of adjacent funnels at the face of the photocell unit; further, the corners of the funnels which coincide with the common point are each right angles.

In this manner, the light spot which illuminates the face of the photocell unit 34 is divided into four parts at the optical axis of the collector tube assembly 14. If these divisions were equal, they would describe quadrants.

The reflector tube assembly 14 may be rotated about its optical axis so that the diagonals through the funnels 40 are oriented respectively horizontally and vertically relative to the predetermined path, and mutually orthogonal to the optical axis. When properly aligned, the light divisions form pairs which are similarly oriented.

The light funnels 40 further transmit the light associated with each division of the light spot to the light sensitive surfaces of four separate photoelectric cells 42, such that one particular surface is illuminated by one particular light division. Support wires 44 hold the photocell unit 34 in place within the reflector tube housing 30.

The electrical wires 20 which are appropriately connected to the photoelectric cells 42 emerge from the photocell unit base 46 and are brought through the collector tube housing 30 as hereinbefore noted. The electrical network associated with the system of the invention is represented in FIG. 5.

For clarity of presentation, attention is directed to FIG. 6, which is a schematic representation of a portion of the network of FIG. 5, being restricted to the basic circuits associated with each pair of photoelectric cells 42. The two photoelectric cells are shown in a horizontal position, indicating that they are the pair associated with the pair of light funnels 40 which are positioned horizontally with respect to the forward direction of the machine 10. Each of these photoelectric cells 42 is connected in a series circuit with a microammeter 50, a potentiometer 52, and a source 54 of direct current electricity. The microammeter 50 and the potentiometer 52 are common to both circuits, however, forming a bridge circuit.

The photoelectric cells 42 used in the circuits shown are solid state, light-sensitive resistors, for example of the cadmium selenide or the cadmium sulfide types, the choice of cell depending upon the frequencies of the light source employed. A voltage potential is impressed across each of the photoelectric cells 42 by the sources 54, and since the resistances of the cells are dependent upon the amount of light striking them, the current associated with each of the photoelectric cells is proportional to the amount of light impinging thereon. The current passing through the microammeter 50 varies in accordance with the arithmetic difference of the individual currents associated with each of the two photocells 42. A relay circuit, indicated at 58, operates warning lights 56, indicating the polarity and magnitude of the current through the microammeter 50. Sensitivity is controlled by adjustment of the potentiometer 52; as the distance between the light source 12 and the collector tube assembly 14 is increased, the intensity of the impinging light decreases and the sensitivity of the circuits must be correspondingly increased.

The circuits shown in FIG. 6 are duplicated for the pair of photoelectric cells 42 associated with the pair of light funnels 40 which are positioned vertically with respect to the forward direction of the machine 10. The components indicated in FIG. 5 as being within the enclosure 60 are located in the reflector tube assembly 14. Those within the enclosure 62 are located within a box in close proximity with the collector tube assembly, and those within enclosure 64 are located within a box 26 which is mounted on the machine 10 within view of the operator. Also included in this box at the machine 10 are four transformers with full wave rectifiers which serve as the direct current voltage sources 54. The duplicate set of microammeters 22, 23 is used to assist in the initial adjustment of the light spot within the reflector tube assembly 14.

When the light spot is equally divided into four parts by the light funnels 40, the illumination of each of the photoelectric cells 42 is identical. If the photoelectric characteristics of the cells were also identical, no current would flow through the microammeters 22, 23, 50, 51. However, since identity of the characteristics of photoelectric cells are exceedingly improbable, a null condition of the microammeters 22, 23, 50, 51 does not necessarily indicate equality of illumination of the cells.

The collector tube assembly 14, then, is initially positioned such that the division of the light spot illuminating the separate photoelectric cells produce equal electrical responses from geometrically opposite cells. When this condition exists, the center of the light spot impinges upon the face of the photocell unit 34, at a point hereinafter called the zero point 38.

Thereafter, any movement of the light source, other than according to the desired path of travel parallel to the tunnel center line, will cause a displacement of the center of the light spot from the zero point 38 on the face of the photocell unit 34. When this occurs, the electrical responses from opposite photoelectric cells 42 will no longer be equal, and the resulting electrical current differences will be indicated by the microammeters 50, 51. The direction of the needles' deflection will indicate the direction of the deviation of the machine from the desired path. The warning lights 56, 57 may be set to operate only after the allowable degree of deviation is reached by suitable adjustment of the set pointers on each of the meter relays. The operator of the machine 10 can then redirect the machine until the null condition is again indicated by both microammeters 50, 51.

If automatic control of the machine 10 is preferred, servomechanisms may be incorporated into this system of the invention, for example by connecting appropriate servosystems to each of the microammeters, which then provide feedback signals. The deviations from the null condition can serve appropriate direction control mechanisms to maintain the desired direction of travel within specified limits. Such feedback servo systems are well known in the art and will not be described herein.

Thus, there has been shown an embodiment of a system for indicating direction and magnitude of the deviations from a desired path of travel of a movable device along a predetermined reference line. The embodiment shown can be adapted, as hereinbefore indicated, for automatic control of the movable device to be guided. Other embodiments of the present invention and modifications of the embodiments herein presented may be developed without departing from the essential characteristics thereof; an example of which is an alternative embodiment suitable for use in conjunction with a machine for the removal of bumps from highway surfaces.

Furthermore, combinations of embodiments may be used without departing from the essential features of the invention; for example, where it is desired to maintain a movable device in a stationary position, a dual system may be used whereby two individual collector tube assemblies are directed at right angles to each other toward a light source which is located in a fixed position with respect to the movable device.

I claim:

1. A system for indicating the direction and magnitude of deviations in directions orthogonal to a desired path of travel of a movable device, such path of travel being along a predetermined reference line, said system comprising:
   (a) a radiation source mounted on the movable device in a fixed position with respect thereto;
   (b) radiation collector means remotely located from the movable device and having an optical axis, said collector means being adjustable for aligning said optical axis to be parallel to the predetermined reference line and to intercept said radiation source;
   (c) radiation sensitive means coupled to said collector means and symmetrically positioned with respect to said optical axis, said radiation sensitive means being responsive to differential changes in relative irradiation in directions mutually orthogonal to said optical axis;
   (d) signaling and display means connected to said radiation sensitive means for providing signals representing changes in relative irradiation with respect to directions mutually orthogonal to said optical axis;
whereby, after initial alignment of said optical axis to be parallel to the predetermined reference line and to intercept said radiation source, subsequent deviations of the movable device in directions orthogonal to the desired path of travel relative to the predetermined reference line are signaled as to direction and magnitude, to enable corrective measures to be taken to restore the actual path of travel to the desired path of travel.

2. A system for indicating the direction and magnitude of deviations from a desired path of travel of a movable device, such path of travel being along a predetermined reference line, said system comprising:
   (a) a light source mounted on the movable device in a fixed position with respect thereto;
   (b) light collector means remotely located from the movable device and having an optical axis, said collector means being adjustable for aligning said optical axis to be parallel to the predetermined reference line and to intercept said light source;
   (c) light sensitive means coupled to said collector means symmetrically positioned with respect to said optical axis, said light sensitive means being responsive to differential changes in relative illumination in directions mutually orthogonal to said optical axis;
   (d) signaling and display means connected to said light sensitive means for providing signals representing changes in relative illumination in directions mutually orthogonal to said optical axis;
whereby, after initial alignment of said optical axis to be parallel to the predetermined reference line and to intercept said light source, subsequent deviations of the movable device from the desired path of travel relative to the predetermined reference line are signaled as to direction and magnitude, to enable corrective measures to be taken to restore the actual path of travel to the desired path of travel.

3. A system for indicating the direction and magnitude of deviations from a desired path of travel of a movable device, such path of travel being along a predetermined reference line, said system comprising:

(a) a light source mounted on the movable device in a fixed position with respect thereto;
(b) light collector means remotely located from said light source, including
  (i) a tube having a longitudinal optical axis, said tube being adjustable for aligning said optical axis to be parallel to the predetermined reference line and to intercept said light source, and
  (ii) reflector means located within said tube and having a focal point located within said tube on said optical axis;
(c) light sensitive means located within said tube and symmetrically positioned with respect to said optical axis, said light sensitive means being responsive to changes in relative illumination about said optical axis; and
(d) signaling and display means connected to said light sensitive means for providing signals representing changes in relative illumination about said optical axis;

whereby, after initial alignment of said optical axis to be parallel to the predetermined reference line and to intercept said light source, subsequent deviations of the movable device from the desired path of travel along the predetermined reference line are signaled as to direction and magnitude, to enable corrective measures to be taken to restore the actual path of travel to the desired path of travel.

4. A system for indicating the direction and magnitude of deviations from a desired path of travel of a movable device, such path of travel being along a predetermined reference line, said system comprising:

(a) a light source mounted on the movable device in a fixed position with respect thereto;
(b) light collector means remotely located from said light source, including
  (i) a tube having a longitudinal optical axis, said tube being adjustable for aligning said optical axis to be parallel to the predetermined reference line and to intercept said light source, and
  (ii) reflector means located within said tube and having a focal point located within said tube on said optical axis;
(c) light sensitive means located within said tube, including
  (i) light division means positioned so that the light about said optical axis is divided into an even plurality of divisions at said optical axis, and
  (ii) an even plurality of light sensitive surfaces, each of said surfaces being separately illuminated by said light divisions such that one particular surface is illuminated by one particular light division;
(d) signaling and display means connected to said light sensitive means for providing signals representing changes in relative illumination about said optical axis;

whereby, after initial alignment of said optical axis to be parallel to the predetermined reference line and to intercept said light source, subsequent deviations of the movable device from the desired path of travel along the predetermined reference line are signaled as to direction and magnitude, to enable corrective measures to be taken to restore the actual path of travel to the desired path of travel.

5. The system of claim 4, wherein said light sensitive surfaces are photoelectric cells, and said signaling and display means provide electrical signals and include electrical meters for indication and display.

6. The combination of claim 4, further including servo means connected to the movable device to control the movement of the movable device according to the desired path of travel along the predetermined reference line.

7. The system of claim 4, wherein said light divisions are four in number, said light sensitive surfaces are four photoelectric cells, and said signaling and display means provide electrical signals and include electrical meters for indication and display.

8. The system of claim 4, wherein said light divisions are four in number and said light sensitive surfaces are four photoelectric cells, and further including servo means connected to the movable device to control the movement of the movable device according to the desired path of travel along the predetermined reference line.

9. The system of claim 4, wherein said light divisions are two in number, said light sensitive surfaces are two photoelectric cells, and said signaling and display means provide electrical signals and include electrical meters for indication and display.

10. The system of claim 4, wherein said light divisions are two in number, and said light sensitive surfaces are two photoelectric cells, and further including servo means connected to the movable device to control the movement of the movable device according to the desired path of travel along the predetermined reference line.

11. A system for indicating the direction and magnitude of deviations from a desired path of travel of a tunneling machine, such path of travel conforming to the tunnel center line, said system comprising:

(a) a light source mounted on the tunneling machine in a fixed position with respect thereto;
(b) light collector means remotely located from said light source, including
  (i) a tube having a longitudinal optical axis, said tube being adjustable for aligning said optical axis to be parallel to the tunnel center line and to intercept said light source, and
  (ii) reflector means located within said tube and having a focal point located within said tube on said optical axis;
(c) light sensitive means located within said tube, including
  (i) light division means positioned so that the light about said optical axis is divided into four divisions at said optical axis, and
  (ii) four light sensitive surfaces, each of said surfaces being separately illuminated by said light divisions such that one particular surface is illuminated by one particular light division;
(d) signaling and display means connected to said light sensitive means for providing signals representing changes in relative illumination about said optical axis;

whereby, after initial alignment of said optical axis to be parallel to the tunnel center line and to intercept said light source, subsequent deviations of the tunneling machine from the desired path of travel conforming to the tunnel center line are signaled as to direction and magnitude, to enable corrective measures to be taken to restore the actual path of travel to the desired path of travel.

12. The combination of claim 11, further including servo means connected to the tunneling machine to control the movement of the tunneling machine according to the desired path of travel along the tunnel center line.

13. A system for indicating the direction and magnitude of deviations from a desired path of travel of the contouring mechanism of a machine for contouring a surface in a desired manner, such path of travel being along a predetermined reference line, said system comprising:

(a) a light source mounted on the contouring machine in a fixed position with respect to the contouring mechanism of the machine;
(b) light collector means remotely located from said light source, including
  (i) a tube having a longitudinal optical axis, said tube being adjustable for aligning said optical axis to be parallel to the predetermined reference line and to intercept said light source, and
  (ii) reflector means located within said tube and having a focal point located within said tube on said optical axis;

(c) light sensitive means located within said tube, including
  (i) light division means positioned so that the light about said optical axis is divided into an even plurality of divisions at said optical axis, and
  (ii) an even plurality of light sensitive surfaces, each of said surfaces being separately illuminated by said light divisions such that one particular surface is illuminated by one particular light division;

(d) signaling and display means connected to said light sensitive means for providing signals representing changes in relative illumination about said optical axis;

whereby, after initial alignment of said optical axis to be parallel to the predetermined reference line and to intercept said light source, subsequent deviations of the contouring mechanism from the desired path of travel along the predetermined reference line are signaled as to direction and magnitude, to enable corrective measures to be taken to restore the actual path of travel to the desired path of travel.

14. The combination of claim 13, further including servo means appropriately connected to the contouring machine and to the contouring mechanism of the contouring machine to control the movement of the contouring mechanism according to a desired path of travel along a predetermined reference line.

References Cited

UNITED STATES PATENTS

| | | | |
|---|---|---|---|
| 2,916,836 | 12/1959 | Stewart et al. | 172—4.5 |
| 2,973,593 | 3/1961 | Zellner et al. | 172—4.5 |
| 3,000,121 | 9/1961 | Martin et al. | 172—4.5 |
| 3,069,983 | 12/1962 | Pizzarotti et al. | 94—46 |
| 3,321,243 | 5/1967 | Williamson et al. | 299—1 |
| 1,942,604 | 1/1934 | Kennedy | 250—203 |
| 2,897,373 | 7/1959 | Lesti | 250—233 X |
| 3,242,340 | 3/1966 | Layne | 250—208 |
| 3,323,408 | 6/1967 | Bishop et al. | 250—203 X |

JAMES W. LAWRENCE, Primary Examiner

V. LAFRANCHI, Assistant Examiner

U.S. Cl. X.R.

172—4.5; 250—204, 209, 234; 299—1